United States Patent
Kim et al.

(10) Patent No.: US 10,884,186 B2
(45) Date of Patent: Jan. 5, 2021

(54) MULTI-CHANNEL RECEIVER OPTICAL SUB ASSEMBLY MODULE FOR FIBER BRAGG GRATING SENSOR

(71) Applicant: Electronics and Telecommunications Research Institute, Daejeon (KR)

(72) Inventors: Hyun Jin Kim, Gwangju (KR); Hyoung Jun Park, Gwangju (KR); Sung Chang Kim, Gwangju (KR); Kye Eun Kim, Naju-si (KR); Ji Hyoung Ryu, Jeonju-si (KR); Gi Hyeon Min, Gwangju (KR); Si Woong Park, Gwangju (KR); Dong Hoon Son, Gwangju (KR); Chan Il Yeo, Gwangju (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/741,151

(22) Filed: Jan. 13, 2020

(65) Prior Publication Data
US 2020/0310029 A1    Oct. 1, 2020

(30) Foreign Application Priority Data
Mar. 28, 2019   (KR) .................... 10-2019-0036287

(51) Int. Cl.
*G02B 6/12* (2006.01)
*G02B 6/02* (2006.01)

(52) U.S. Cl.
CPC ....... *G02B 6/12021* (2013.01); *G02B 6/0208* (2013.01); *G02B 2006/121* (2013.01); *G02B 2006/12107* (2013.01); *G02B 2006/12111* (2013.01); *G02B 2006/12138* (2013.01)

(58) Field of Classification Search
None
See application file for complete search history.

(56) References Cited

U.S. PATENT DOCUMENTS

| 6,411,748 B1 | 6/2002 | Foltzer |
| 7,327,771 B2 | 2/2008 | Kim et al. |
| 7,512,291 B2 | 3/2009 | Mendoza |

(Continued)

FOREIGN PATENT DOCUMENTS

| JP | 2003-035830 | 2/2003 |
| KR | 10-0785046 | 12/2007 |
| KR | 10-2013-0017820 | 2/2013 |

*Primary Examiner* — Jerry Rahll
(74) *Attorney, Agent, or Firm* — Kile Park Reed & Houtteman PLLC

(57) ABSTRACT

A multi-channel receiver optical sub assembly module for a fiber Bragg grating sensor according to an embodiment of the present invention includes a housing, a connection socket, an optical bench, a thermoelectric cooler, an arrayed waveguide grating chip, a photodiode array disposed on the optical bench and including a plurality of photodiode chips connected to the optical channels of the arrayed waveguide grating chip, and a printed circuit board which is connected to the other side of the housing while passing through the other side of the housing, of which a portion of a body is disposed on the optical bench, and which is connected to the photodiode array.

20 Claims, 7 Drawing Sheets

(56) References Cited

U.S. PATENT DOCUMENTS

| | | |
|---|---|---|
| 8,320,763 B2 | 11/2012 | Kim et al. |
| 9,268,098 B2 | 2/2016 | Kat |
| 2002/0181857 A1 | 12/2002 | Komatsu et al. |
| 2013/0272656 A1 | 10/2013 | Abtahi et al. |
| 2016/0154177 A1* | 6/2016 | Han .................... G02B 6/4279 385/14 |

* cited by examiner

MULTI-CHANNEL RECEIVER OPTICAL SUB ASSEMBLY MODULE FOR FIBER BRAGG GRATING SENSOR

CROSS-REFERENCE TO RELATED APPLICATION

This application claims priority to and the benefit of Korean Patent Application No. 10-2019-0036287, filed on Mar. 28, 2019, the disclosure of which is incorporated herein by reference in its entirety.

BACKGROUND

1. Field of the Invention

The present invention relates to a multi-channel receiver optical sub assembly module, and more particularly, to a multi-channel receiver optical sub assembly module for a fiber Bragg grating sensor, which is capable of easily detecting a sensing measurement value by applying a planar lightwave circuit (PLC)-based arrayed waveguide grating (AWG) chip as an edge wavelength filter.

2. Discussion of Related Art

When germanium (Ge)-containing optical fiber cores are exposed to light having a wavelength near 240 nm, a refractive index thereof is increased. When a refractive index of an optical fiber is periodically changed using the properties of the optical fiber core, a fiber Bragg grating (FBG) is achieved.

Recently, the FBG has been widely applied in optical communication, an optical sensor, and the like. Such an FBG may be classified into a fiber Bragg grating (FBG), a long period grating (LPG), a tilted FBG (TFBG), a chirped FBG (CFBG), and a sampled FBG (SFBG) according to the use and form thereof.

In general, the FBG is mainly used for sensor applications. In this case, changes in external physical quantities such as temperature, strain, and vibration applied to the FBG may be detected from a change in wavelength of the FBG. Various studies are being conducted on a method of detecting a wavelength of an FBG.

SUMMARY OF THE INVENTION

The present invention is directed to providing a multi-channel receiver optical sub assembly module for a fiber Bragg grating sensor, which is capable of easily detecting a sensing measurement value by applying a planar lightwave circuit (PLC)-based arrayed waveguide grating chip (AWG chip) as an edge wavelength filter.

The effects of the present invention are not limited to the aforesaid, but other effects not described herein will be clearly understood by those skilled in the art from descriptions below.

According to an aspect of the present invention, there is provided a multi-channel receiver optical sub assembly module for a fiber Bragg grating sensor including a housing having an accommodation space therein and including a light incident portion at one side thereof, a connection socket connected to the light incident portion of the housing, an optical bench disposed on an inner bottom of the housing, a thermoelectric cooler disposed on the optical bench, an arrayed waveguide grating chip disposed on the thermoelectric cooler and having a plurality of optical channels, a photodiode array disposed on the optical bench and including a plurality of photodiode chips connected to the optical channels of the arrayed waveguide grating chip, and a printed circuit board which is connected to the other side of the housing while passing through the other side of the housing, of which a portion of a body is disposed on the optical bench, and which is connected to the photodiode array.

The photodiode chip may receive an optical signal transmitted through the optical channel of the arrayed waveguide grating chip without a separate lens.

Lead wires may be wire-bonded between the optical channels and the photodiode chips and between the photodiode chips and the printed circuit board.

The optical channels and the photodiode chips may be disposed and connected at certain intervals.

The arrayed waveguide grating chip may have four optical channels, and the optical channels may be disposed at an interval of 10 nm.

The arrayed waveguide grating chip may have four optical channels and may detect wavelengths of four fiber Bragg grating sensors according to the optical channels.

In the arrayed waveguide grating chip, wavelengths of fiber Bragg grating sensors may be attachable to or detectable according to the plurality of optical channels.

A thermistor may be provided on the arrayed waveguide grating chip.

The printed circuit board may be a flexible printed circuit board (F-PCB).

A reinforcement panel may be provided below the printed circuit board.

The optical bench may be made of a metal material.

The connection socket may be detachable from the light incident portion of the housing.

The connection socket may be formed in a lucent connector (LC) type.

The other side of the housing may be provided with a slit through which the printed circuit board passes.

According to another aspect of the present invention, there is provided a multi-channel receiver optical sub assembly module for a fiber Bragg grating sensor including a housing having an accommodation space therein and including a light incident portion at one side thereof, a connection socket connected to the light incident portion of the housing, an optical bench made of a metal and disposed on an inner bottom of the housing, a thermoelectric cooler disposed on the optical bench, an arrayed waveguide grating chip disposed on the thermoelectric cooler and having a plurality of optical channels, a thermistor which senses a temperature of the arrayed waveguide grating chip, a photodiode array disposed on the optical bench and including a plurality of photodiode chips connected to the optical channels of the arrayed waveguide grating chip, and a printed circuit board which is connected to the other side of the housing while passing through the other side of the housing, of which a portion of a body is disposed on the optical bench, and which is connected to the photodiode array.

DETAILED DESCRIPTION OF EXEMPLARY EMBODIMENTS

The advantages and features of the present invention and methods for accomplishing the same will be more clearly understood from embodiments described below with reference to the accompanying drawings. However, the present invention is not limited to the following embodiments but may be implemented in various different forms. Rather, these embodiments are provided to only complete the disclosure of the present invention and to allow those skilled in the art to understand the category of the present invention. The present invention is defined by the category of the claims. Meanwhile, terms used in this specification are to describe the embodiments and are not intended to limit the present invention. As used herein, singular expressions, unless defined otherwise in contexts, include plural expressions. It will be further understood that the terms "comprises," "comprising," "includes," and/or "including," if used herein, specify the presence of stated components, steps, operations, and/or elements, but do not preclude the presence or addition of one or more other components, steps, operations, and/or elements.

Hereinafter, exemplary embodiments of the present invention will be described in detail with reference to the accompanying drawings.

Figure 1:
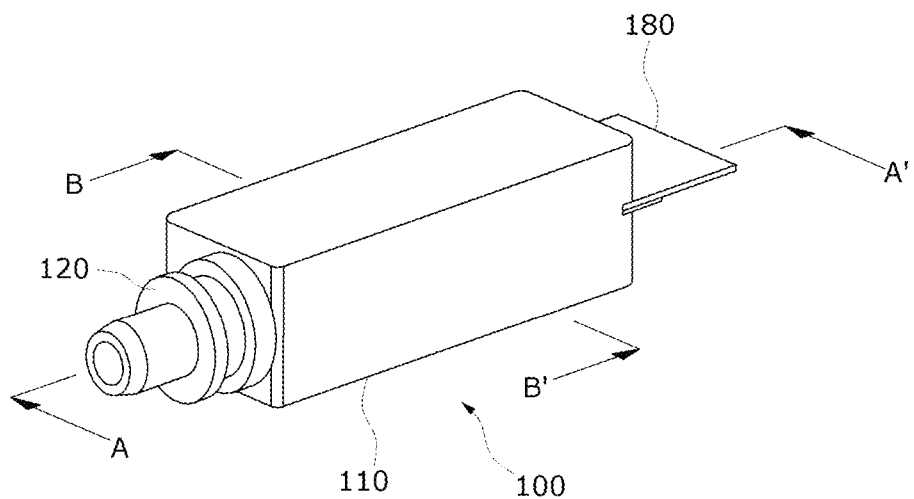
FIG. 1 is a perspective view illustrating a multi-channel receiver optical sub assembly module for a fiber Bragg grating sensor according to an embodiment of the present invention.
Figure 2:
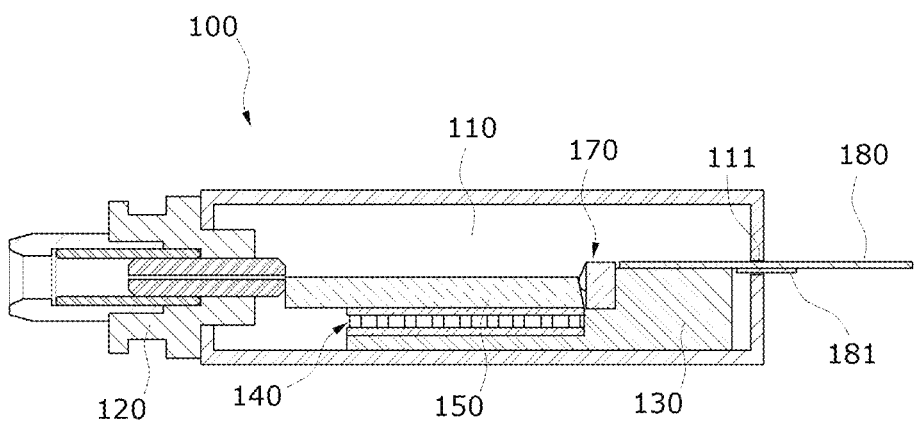
FIG. 2 is a cross-sectional view taken along line A-A' of FIG. 1.
Figure 3:
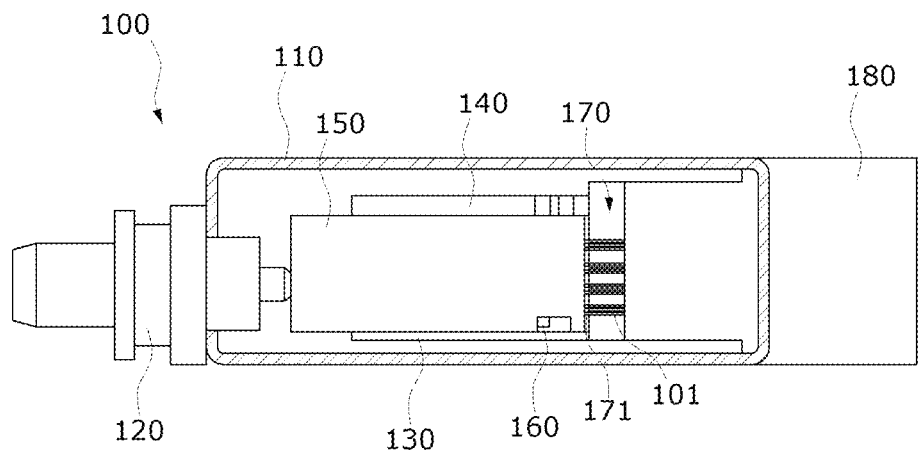
FIG. 3 is a cross-sectional view taken along line B-B' of FIG. 1.

FIG. 1 is a perspective view illustrating a multi-channel receiver optical sub assembly module for a fiber Bragg grating sensor according to an embodiment of the present invention. FIG. 2 is a cross-sectional view taken along line A-A' of FIG. 1. FIG. 3 is a cross-sectional view taken along line B-B' of FIG. 1.

For convenience of description, descriptions will be made with reference to FIGS. 1 to 3 at the same time.

Referring to FIGS. 1 to 3 at the same time, a multi-channel receiver optical sub assembly module 100 for a fiber Bragg grating sensor mainly includes a housing 110, a connection socket 120, an optical bench 130, a thermoelectric cooler (TEC) 140, an arrayed waveguide grating chip (AWG chip) 150, a thermistor 160, a photodiode array 170, and a printed circuit board 180.

The housing 110 is a body in which an accommodation space is formed.

A light incident portion is provided at one side of the housing 110, and a slit 111 formed in the form of a long hole in a horizontal direction is provided at the other side of the housing 110.

Here, the light incident portion corresponds to an entrance side through which light is incident and has a mounting hole passing through a portion thereof.

The connection socket 120 is connected to the light incident portion of the housing 110. In this case, the connection socket 120 is formed in the form of a lucent connector (LC) type receptacle. The connection socket 120 is formed in the form of a female terminal connected to a separate male terminal.

The connection socket 120 has a structure that is detachable from the light incident portion of the housing 110. In this case, the connection socket 120 allows an optical fiber-based sensor to be easily mounted or detached.

The optical bench 130 is disposed on an inner bottom of the housing 110. The optical bench 130 may be a metal optical bench (MOB) made of a metal material.

The TEC 140 is disposed on the optical bench 130. The TEC 140 may adjust a temperature.

The AWG chip 150 is disposed on the TEC 140 and has a plurality of optical channels. In this case, the AWG chip 150 has four optical channels. The optical channels may be disposed at an interval of 10 nm.

The AWG chip 150 may detect wavelengths of four fiber Bragg grating sensors according to the optical channels.

The thermistor 160 is disposed on the AWG chip 150 and detects a slight change in temperature of the AWG chip 150. In this case, a change in temperature and a change value of an optical wavelength of the AWG chip 150 may be measured through a separate controller (not shown).

That is, the controller may compare a preset temperature of the AWG chip 150 with a changed temperature and then measure a change value of a wavelength of the AWG chip 150 according to a change in temperature.

The photodiode array 170 is disposed on the optical bench 130. The photodiode array 170 includes a plurality of photodiode chips 171 connected to the optical channels of the AWG chip 150.

The photodiode chip 171 directly receives an optical signal transmitted through the optical channel of the AWG chip 150. In other words, the photodiode chip 171 may directly receive the optical signal without a separate lens.

Lead wires 101 are wire-bonded to connect the photodiode chips 171 and the optical channels.

In this case, the optical channels and the photodiode chips 171 are disposed and connected at certain intervals.

The four-channel photodiode array 170 may be manufactured by performing an entire device manufacturing process once on the same epitaxial wafer.

Accordingly, a manufacturer may manufacture the photodiode array 170 having two channels, four channels, six channels, eight channels, or the like by dicing the epitaxial wafer into a desired number of channels without an additional process or cost.

The printed circuit board 180 is connected to the other side of the housing 110 while passing through the other side of the housing 110, and a portion of a body thereof is disposed on the optical bench 130. In this case, the printed circuit board 180 is connected to the photodiode array 170.

Here, a lead wire is wire-bonded to connect the printed circuit board 180 and the photodiode chip 171.

The printed circuit board 180 may be a flexible printed circuit board (F-PCB). To this end, a reinforcement panel 181 is provided below the printed circuit board 180. The reinforcement panel 181 may be seated in the slit 111 of the housing 110.

Figure 4:
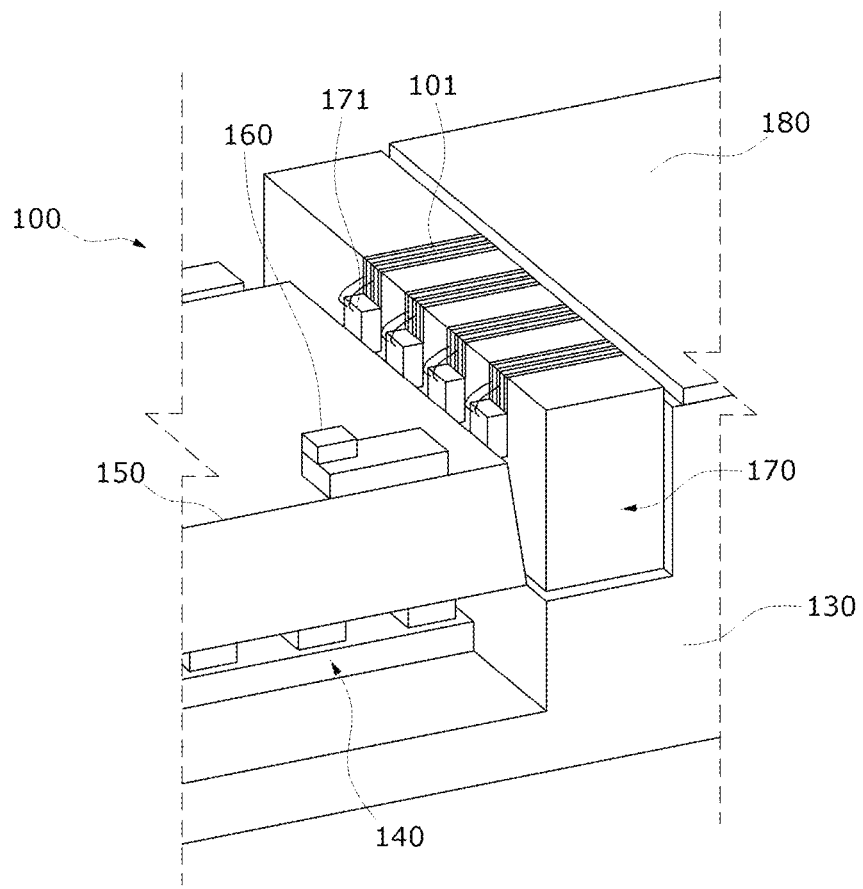
FIG. 4 is a view illustrating an internal structure of a housing in the multi-channel receiver optical sub assembly module for a fiber Bragg grating sensor according to the embodiment of the present invention.

FIG. 4 is a view illustrating an internal structure of the housing in the multi-channel receiver optical sub assembly module for a fiber Bragg grating sensor according to the embodiment of the present invention.

Referring to FIG. 4, an internal structure of the multi-channel receiver optical sub assembly module 100 for a fiber Bragg grating sensor may be confirmed in detail. In this case, repetitive contents described with reference to FIGS. 1 to 3 will be omitted.

The optical bench 130 may fix the TEC 140, the photodiode array 170, and the printed circuit board 180 and may adjust an optical system while constantly maintaining an optical axis.

The optical bench 130 has different step heights according to sections in which the TEC 140, the photodiode array 170, and the printed circuit board 180 are disposed. The structure of the optical bench 130 allows a change in temperature of the AWG chip 150 to be effectively sensed through an adjustment of an interval between components.

Figure 5A:
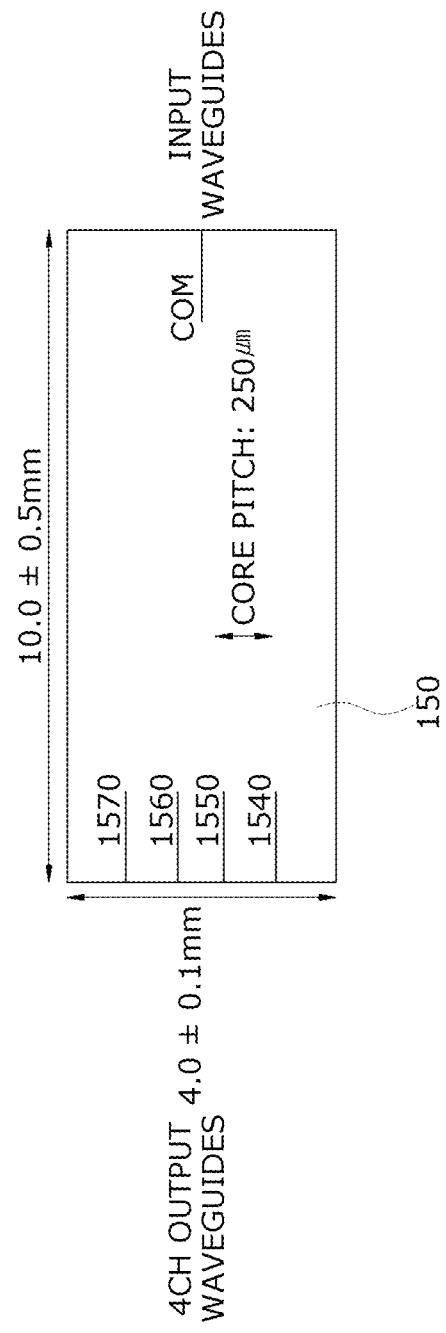
FIGS. 5A to 5C are views illustrating an arrayed waveguide grating chip in the multi-channel receiver optical sub assembly module for a fiber Bragg grating sensor according to the embodiment of the present invention.
Figure 5B:
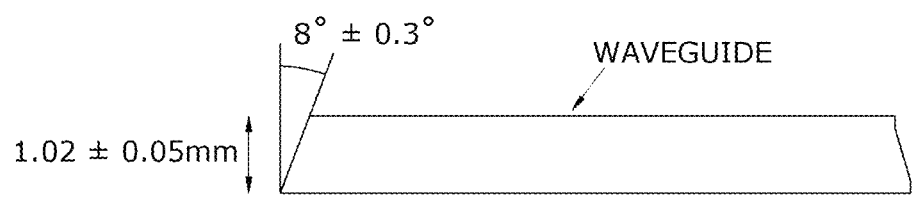
Figure 5C:
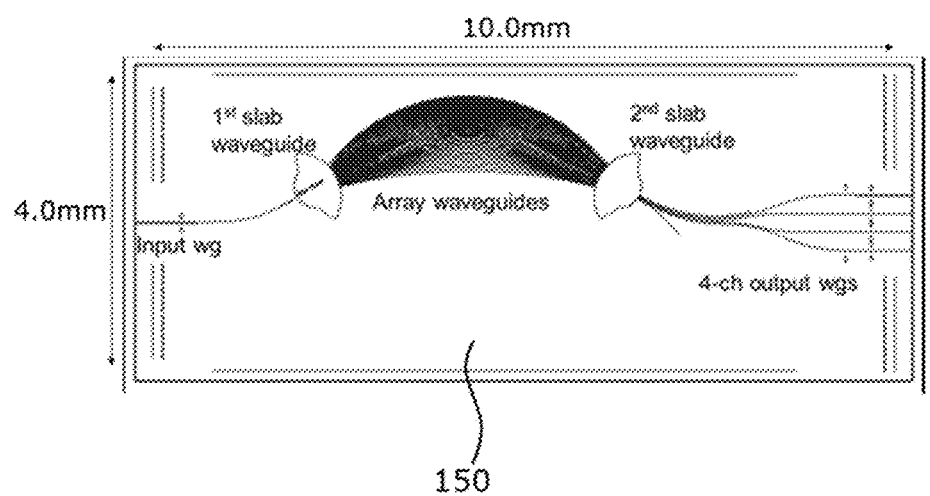

FIGS. 5A to 5C are views illustrating the AWG chip in the multi-channel receiver optical sub assembly module for a fiber Bragg grating sensor according to the embodiment of the present invention.

Referring to FIGS. 5A to 5C, a design result of the AWG chip 150 for detecting wavelengths of four fiber Bragg grating sensors may be confirmed.

The AWG chip 150 has center wavelengths of 1,540 nm, 1,550 nm, 1,560 nm, and 1,570 nm at an interval of 10 nm, and four wavelength filters are selected for incident light according to the center wavelengths. Accordingly, an optical wavelength may be detected through the AWG chip 150.

In the AWG chip 150, cross sections of a light input portion and a light output portion may form a degree of 8°, thereby minimizing a reflection loss and an interference noise effect.

As design conditions of the AWG chip 150, a light output portion core pitch is 250 µm, a waveguide height and width are 3 µm, a focal length is 594.9 µm, and a path length difference is 12.8 µm. Due to the design conditions of the AWG chip 150, it is possible to obtain design result values shown in FIGS. 5A to 5C.

Figure 6:
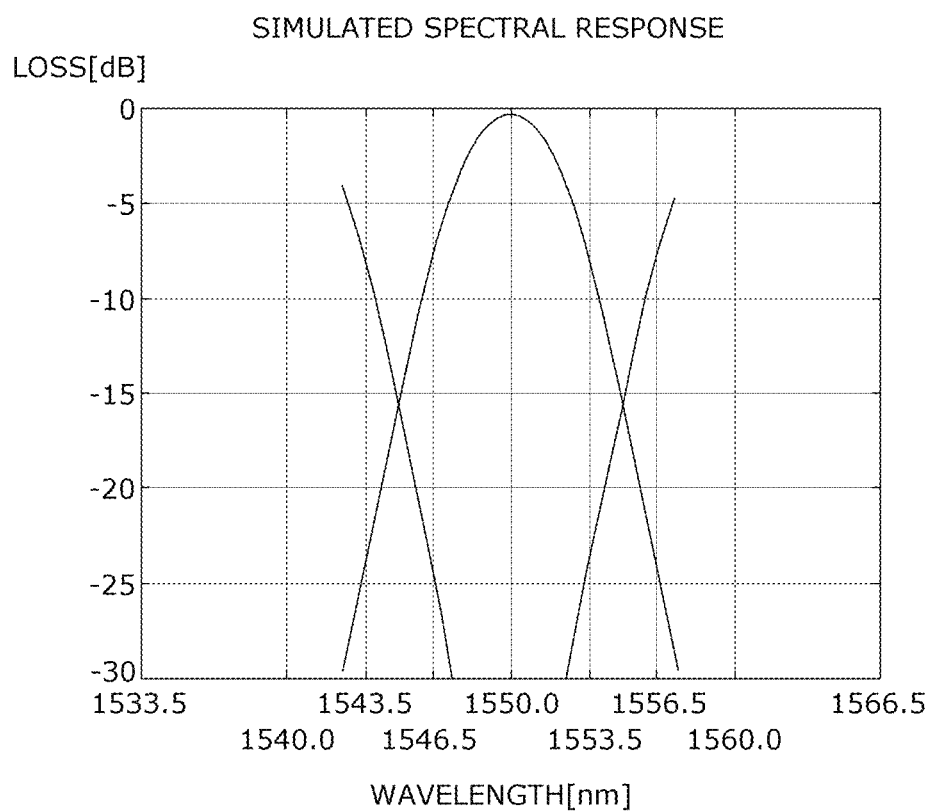
FIG. 6 is a graph showing simulation results of the arrayed waveguide grating chip in the multi-channel receiver optical sub assembly module for a fiber Bragg grating sensor according to the embodiment of the present invention.

FIG. 6 is a graph showing simulation results of the AWG chip in the multi-channel receiver optical sub assembly module for a fiber Bragg grating sensor according to the embodiment of the present invention.

Referring to FIG. 6, the simulation results of the AWG chip are results of a channel having a center wavelength of 1,550 nm. It can be confirmed that as designed set values, an insertion loss is 1.5 dB or less according to a channel interval of 10 nm, a 1 dB bandwidth is 2.38 nm, and a 3 dB bandwidth is 4.01 nm.

According to the simulation results, in the filter having the center wavelength of 1,550 nm, it can be confirmed that a wavelength change of a fiber Bragg grating sensor may be detected in a range of 15 dB in a wavelength range of about ±5 nm.

Figure 7:
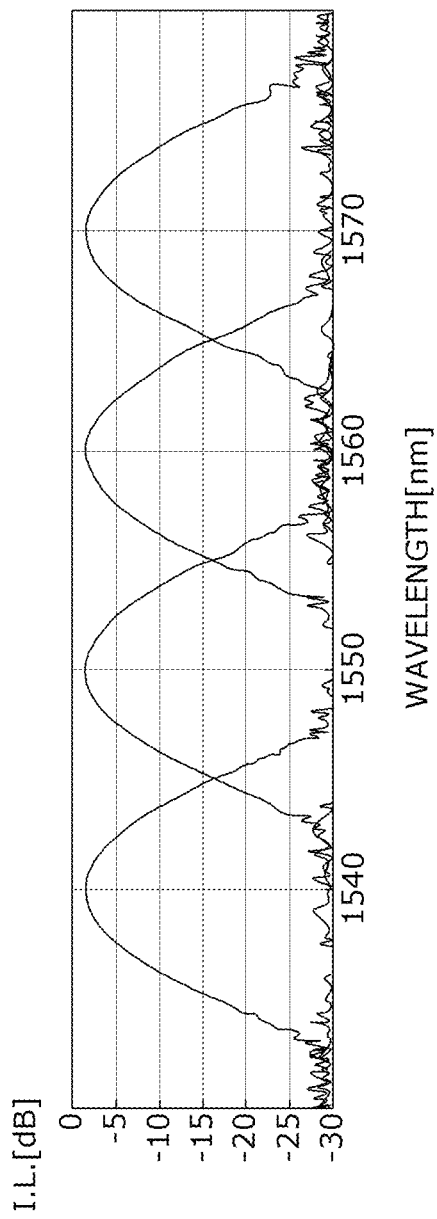
FIG. 7 is a graph showing results of measuring optical characteristics of the arrayed waveguide grating chip in the multi-channel receiver optical sub assembly module for a fiber Bragg grating sensor according to the embodiment of the present invention.

FIG. 7 is a graph showing results of measuring optical characteristics of the AWG chip in the multi-channel receiver optical sub assembly module for a fiber Bragg grating sensor according to the embodiment of the present invention.

Referring to FIG. 7, FIG. 7 shows values of the results of measuring the optical characteristics of the AWG chip. The AWG chip may detect wavelengths of four fiber Bragg grating sensors based on center wavelengths of 1,540 nm, 1,550 nm, 1,560 nm, and 1,570 nm according to channels.

In this case, the AWG chip is applied as a wavelength filter. Since characteristics of the wavelength filter have Gaussian wavelength transmission characteristics, a linearization algorithm is required for detecting a wavelength.

Figure 8:
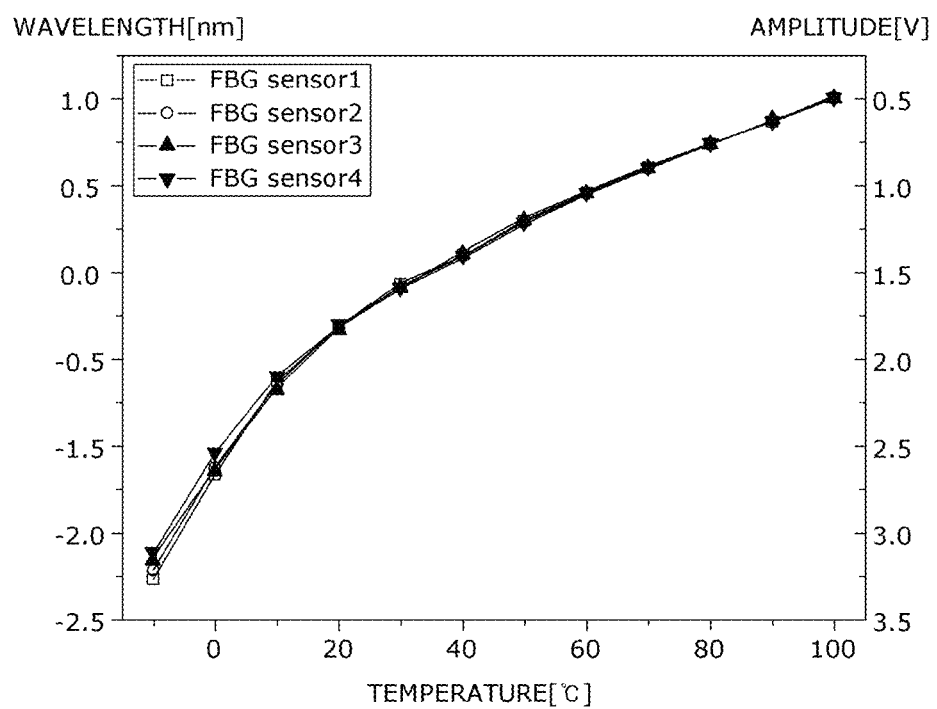
FIG. 8 is a graph showing results of detecting a light wavelength of the multi-channel receiver optical sub assembly module for a fiber Bragg grating sensor according to the embodiment of the present invention.

FIG. 8 is a graph showing results of detecting a light wavelength of the multi-channel receiver optical sub assembly module for a fiber Bragg grating sensor according to the embodiment of the present invention.

Referring to FIG. 8, four fiber Bragg grating (FBG) sensors 1, 2, 3, and 4 were manufactured to have center wavelengths of 1,542.5 nm, 1,552.5 nm, 1,562.5 nm, and 1,572.5 nm at room temperature. In this case, according to characteristics of an AWG chip filter, it can be confirmed that there are nonlinear characteristics as a temperature is decreased from room temperature.

Nonlinear operation characteristics of wavelength detection according to a change in temperature may be easily compensated for through a polynomial algorithm or a Gaussian function.

According to the present invention, it is possible to easily detect a sensing measurement value by applying a planar lightwave circuit (PLC)-based AWG chip as an edge wavelength filter.

In particular, according to the present invention, it is possible to directly receive light without a lens so that there is no need for a separate complicated filter detection device or module.

In addition, according to the present invention, an AWG chip mass-produced at a low cost is used, thereby providing a small package module structure.

The present invention is not limited to the above-described embodiments and may be variously modified without departing from the technical spirit of the present invention.

What is claimed is:

1. A multi-channel receiver optical sub assembly module for a fiber Bragg grating sensor, comprising:
   a housing having an accommodation space therein and including a light incident portion at one side thereof;
   a connection socket connected to the light incident portion of the housing;
   an optical bench disposed on an inner bottom of the housing;
   a thermoelectric cooler disposed on the optical bench;
   an arrayed waveguide grating chip disposed on the thermoelectric cooler and having a plurality of optical channels;
   a photodiode array disposed on the optical bench and including a plurality of photodiode chips connected to the optical channels of the arrayed waveguide grating chip; and
   a printed circuit board which is connected to the other side of the housing while passing through the other side of the housing, of which a portion of a body is disposed on the optical bench, and which is connected to the photodiode array,
   wherein the arrayed waveguide grating chip is configured to allow wavelengths of four fiber Bragg grating sensors to be detected.

2. The multi-channel receiver optical sub assembly module of claim 1, wherein the photodiode chip receives an optical signal transmitted through the optical channel of the arrayed waveguide grating chip.

3. The multi-channel receiver optical sub assembly module of claim 1, wherein lead wires are wire-bonded between the optical channels and the photodiode chips and between the photodiode chips and the printed circuit board.

4. The multi-channel receiver optical sub assembly module of claim 1, wherein the optical channels and the photodiode chips are disposed and connected at certain intervals.

5. The multi-channel receiver optical sub assembly module of claim 1, wherein the arrayed waveguide grating chip has four optical channels, and
the optical channels are disposed at an interval of 10 nm.

6. The multi-channel receiver optical sub assembly module of claim 1, wherein the arrayed waveguide grating chip has four optical channels configured to allow the wavelengths of the four fiber Bragg grating sensors to be detected.

7. The multi-channel receiver optical sub assembly module of claim 1, wherein a thermistor is provided on the arrayed waveguide grating chip.

8. The multi-channel receiver optical sub assembly module of claim 1, wherein the printed circuit board is a flexible printed circuit board (F-PCB).

9. The multi-channel receiver optical sub assembly module of claim 8, wherein a reinforcement panel is provided below the printed circuit board.

10. The multi-channel receiver optical sub assembly module of claim 1, wherein the optical bench is made of a metal material.

11. The multi-channel receiver optical sub assembly module of claim 1, wherein the connection socket is attachable to or detachable from the light incident portion of the housing.

12. The multi-channel receiver optical sub assembly module of claim 1, wherein the connection socket is a lucent connector (LC) type.

13. The multi-channel receiver optical sub assembly module of claim 1, wherein the other side of the housing is provided with a slit through which the printed circuit board passes.

14. A multi-channel receiver optical sub assembly module for a fiber Bragg grating sensor, comprising:
a housing having an accommodation space therein and including a light incident portion at one side thereof;
a connection socket connected to the light incident portion of the housing;
an optical bench made of a metal and disposed on an inner bottom of the housing;
a thermoelectric cooler disposed on the optical bench;
an arrayed waveguide grating chip disposed on the thermoelectric cooler and having a plurality of optical channels;
a thermistor which senses a temperature of the arrayed waveguide grating chip;
a photodiode array disposed on the optical bench and including a plurality of photodiode chips connected to the optical channels of the arrayed waveguide grating chip; and
a printed circuit board which is connected to the other side of the housing while passing through the other side of the housing, of which a portion of a body is disposed on the optical bench, and which is connected to the photodiode array,
wherein the arrayed waveguide grating chip is configured to allow wavelengths of four fiber Bragg grating sensors to be detected.

15. The multi-channel receiver optical sub assembly module of claim 14, wherein lead wires are wire-bonded between the optical channels and the photodiode chips and between the photodiode chips and the printed circuit board.

16. The multi-channel receiver optical sub assembly module of claim 14, wherein the optical channels and the photodiode chips are disposed and connected at certain intervals.

17. The multi-channel receiver optical sub assembly module of claim 14, wherein the arrayed waveguide grating chip has four optical channels, and
the optical channels are disposed at an interval of 10 nm.

18. The multi-channel receiver optical sub assembly module of claim 14, wherein the arrayed waveguide grating chip has four optical channels configured to allow the wavelengths of the four fiber Bragg grating sensors to be detected.

19. The multi-channel receiver optical sub assembly module of claim 14, wherein the arrayed waveguide grating chip allows wavelengths of fiber Bragg grating sensors to be detected according to the plurality of optical channels.

20. The multi-channel receiver optical sub assembly module of claim 14, wherein the connection socket is attachable to or detachable from the light incident portion of the housing.

* * * * *